(12) United States Patent
Timpson et al.

(10) Patent No.: US 12,132,186 B2
(45) Date of Patent: Oct. 29, 2024

(54) BATTERY AND COOLING DEVICE SYSTEM

(71) Applicant: Honeywell Federal Manufacturing & Technologies, LLC, Kansas City, MO (US)

(72) Inventors: Erik J. Timpson, Lee's Summit, MO (US); George W. Bohnert, Harrisonville, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 313 days.

(21) Appl. No.: 17/502,211

(22) Filed: Oct. 15, 2021

(65) Prior Publication Data
US 2023/0117348 A1   Apr. 20, 2023

(51) Int. Cl.
| | |
|---|---|
| *H01M 10/6569* | (2014.01) |
| *H01M 10/39* | (2006.01) |
| *H01M 10/613* | (2014.01) |
| *H01M 10/6568* | (2014.01) |
| *H01M 10/6595* | (2014.01) |

(52) U.S. Cl.
CPC ....... *H01M 10/6569* (2015.04); *H01M 10/39* (2013.01); *H01M 10/613* (2015.04); *H01M 10/6568* (2015.04); *H01M 10/6595* (2015.04)

(58) Field of Classification Search
None
See application file for complete search history.

(56) References Cited

U.S. PATENT DOCUMENTS

| | | |
|---|---|---|
| 9,078,379 B2 | 7/2015 | Campbell et al. |
| 2005/0151554 A1* | 7/2005 | Rae .............. H01L 23/36 |
| | | 257/E23.101 |
| 2005/0229871 A1* | 10/2005 | Robertson .............. F24D 3/08 |
| | | 122/32 |
| 2013/0000032 A1 | 1/2013 | Huettner et al. |
| 2013/0003296 A1* | 1/2013 | Huettner ........... H05K 7/20827 |
| | | 361/679.52 |
| 2017/0001053 A1 | 4/2017 | Shedd et al. |
| 2017/0105313 A1* | 4/2017 | Shedd ............... H05K 7/20809 |
| 2017/0002141 A1 | 7/2017 | Onnerud et al. |
| 2019/0356023 A1* | 11/2019 | Tenorio ................ H01M 10/39 |
| 2022/0407136 A1* | 12/2022 | Satoh ................ H01M 10/633 |

OTHER PUBLICATIONS

What is a heatpipe heatsink? Webpage: https://www.radianheatsinks.com/heatpipe/.

* cited by examiner

*Primary Examiner* — Ula C Ruddock
*Assistant Examiner* — Mary Grace Byram
(74) *Attorney, Agent, or Firm* — Hovey Williams LLP

(57) ABSTRACT

A battery and cooling device system comprising a thermal battery and a cooling device including a boiler, a condenser, a vapor tube, a reaction container, and a siphon. The boiler boils a solvent via heat drawn from the battery. The condenser condenses the vaporized solvent. The vapor tube connects the boiler to the reaction container so that the vaporized solvent travels through the vapor tube from the boiler into the condenser. The reaction container receives the liquidated solvent from the condenser so that the liquidated solvent interacts with a solute in the reaction container to effect an endothermic reaction to further draw heat from the battery. The siphon connects the reaction container to the boiler and drains the liquid solvent from the reaction container into the boiler once a predetermined amount of liquid solvent fills the reaction container.

18 Claims, 3 Drawing Sheets

BATTERY AND COOLING DEVICE SYSTEM

GOVERNMENT INTERESTS

This invention was made with Government support under Contract No.: DE-NA-0002839 awarded by the United States Department of Energy/National Nuclear Security Administration. The Government has certain rights in the invention.

BACKGROUND

Thermal batteries have long shelf lives, but they are seldom used because they become extremely hot when activated and often must be accompanied by cooling devices. Furthermore, most thermal batteries are one-time use, so the cooling devices are often disposed with the thermal batteries, thus creating significant waste.

SUMMARY OF THE INVENTION

Embodiments of the present invention solve the above-mentioned problems and provide a distinct advance in the art of battery cooling. More particularly, the present invention provides a battery and cooling device system that dissipates heat from the battery via a vaporization, condensation, and endothermic reaction cycle.

An embodiment of the battery and cooling device system broadly comprises a thermal battery and a cooling device. An embodiment of the cooling device includes a boiler, a condenser, a vapor tube, a reaction container, an extraction thimble, and a siphon.

The thermal battery provides electrical energy and may be a molten-salt battery, a liquid-metal battery, or other high heat-output battery. The thermal battery may be rechargeable or non-rechargeable and may be stored in a solid state at room temperature for long periods of time before being activated.

The cooling device is thermally coupled with the battery to efficiently remove heat therefrom. The cooling device is configured so that the battery may be removed and/or replaced. In this way, the cooling device may be reused even if the battery is not reusable or rechargeable.

The boiler is positioned adjacent to the thermal battery and forms a boiling chamber. The boiler is a flask or similar container and may be made of glass, ceramic, or other material capable of withstanding high temperatures. The boiler contains liquid solvent configured to be boiled into its vapor form for use in an endothermic reaction.

The condenser is fluidly connected to the boiler via the vapor tube and via the reaction container. The condenser includes a condensing chamber and a circulation chamber. The condenser is positioned above the boiler and the reaction container.

The vapor tube fluidly connects the boiler to the reaction container. More specifically, the vapor tube extends vertically from near an upper end of the boiler to near an upper end of the reaction container.

The reaction container is positioned above the boiler and below the condenser and forms a reaction chamber. The reaction container is fluidly connected to the boiler via the vapor tube and the siphon. The reaction container contains solute in the form of ammonium chloride, ammonium nitrate, disodium tetraborate decahydrate, or any other suitable material that may act as a solute in an endothermic reaction.

The extraction thimble is positioned in the reaction chamber of the reaction container and holds the solute therein. The extraction thimble is porous to allow liquid solvent to pass through while retaining dissolved solute.

The siphon fluidly connects the reaction container to the boiler. The siphon extends vertically upward from near a lower end of the reaction container then vertically downward to near an upper end of the boiler, thereby forming an inverted U shape. An upper end of the U shape is lower than an upper end of the extraction thimble and lower than the upper end of the vapor tube.

In use, the thermal battery may be activated to provide an intended electrical energy output. The thermal battery generates incidental heat that boils the liquid solvent in the boiling chamber of the boiler so that the liquid solvent changes to its vapor phase. The boiling action draws heat from the thermal battery.

The vaporized solvent then travels up the vapor tube into the reaction chamber of the reaction container. The vaporized solvent continues into the condensing chamber of the condenser. The condenser then cools at least some of the vaporized solvent so that it condenses to its liquid phase and drops into the reaction chamber of the reaction container.

The liquidated solvent then dissolves some of the solute in the extraction thimble, resulting in a liquid solution. This is an endothermic reaction, which further draws heat from the thermal battery, either directly or indirectly. The extraction thimble retains the dissolved solute while allowing the liquidated solvent to pass through its pores outside of the extraction thimble but inside the reaction chamber. Some of the liquidated solvent also fills the upward portion of the siphon.

A level of the liquidated solvent in the reaction chamber and the upward portion of the siphon rises as more solvent is condensed in the condensing chamber until the upper portion of the siphon is filled and begins to spill into the downward portion of the siphon. This triggers a siphon effect in which the liquidated solvent drains through the siphon into the boiling chamber of the boiler, leaving solidified solute in the extraction thimble.

Boiling of liquid solvent in the boiler, condensing of vaporized solvent in the condenser, and dissolving of solute in the reaction container is virtually continuous, with draining of the liquid solvent from the reaction container being cyclic. To that end, there is enough liquid solvent to sustain continuous boiling, condensing, and dissolving.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
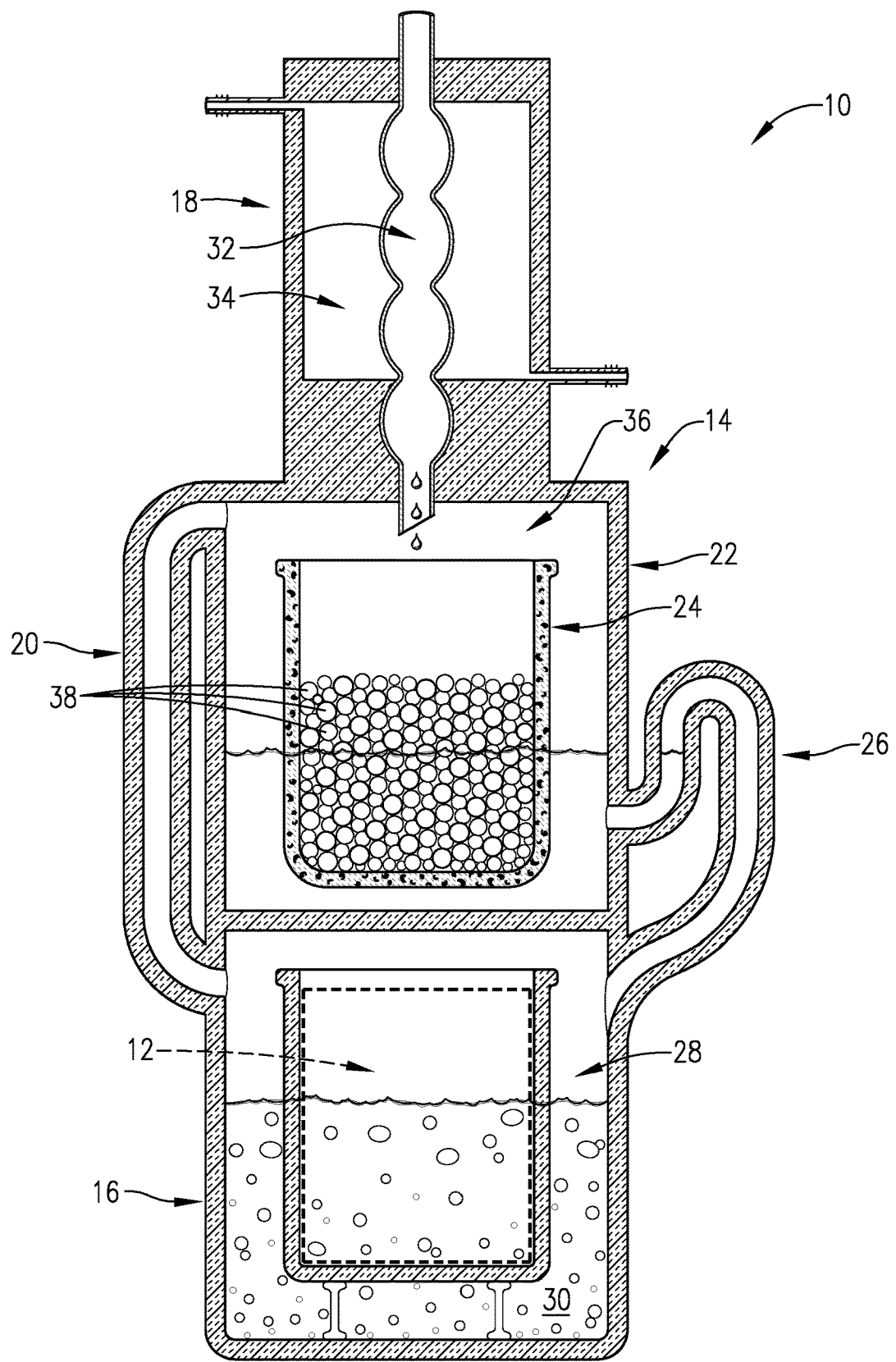
FIG. 1 is a front elevation view of a battery and cooling device system constructed in accordance with an embodiment of the invention.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 2:
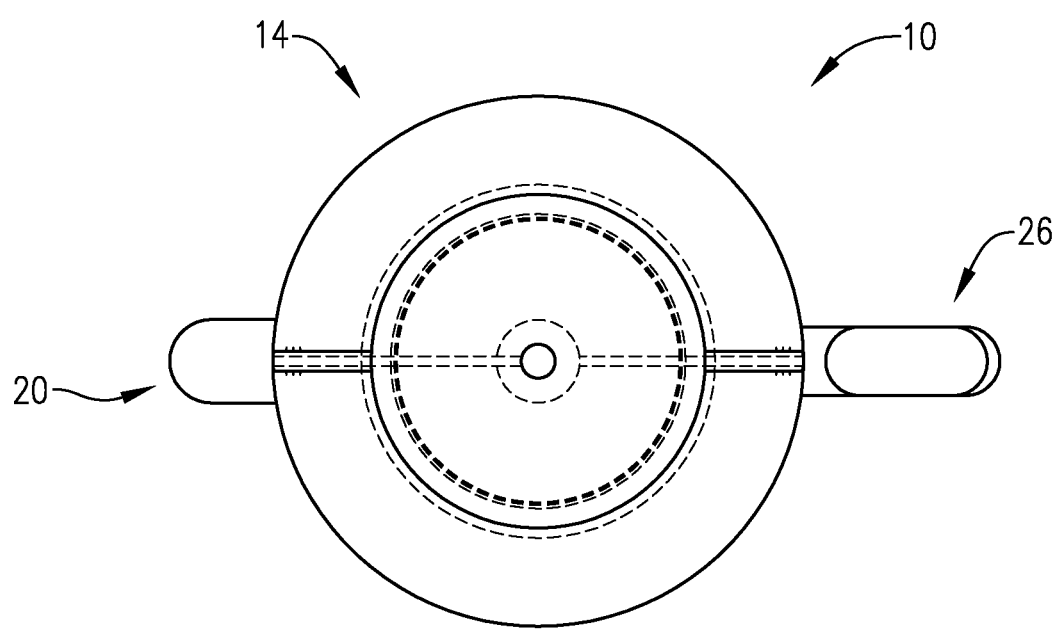
FIG. 2 is a top plan view of the battery and cooling device system of FIG. 1.

Turning to FIGS. 1 and 2, a battery and cooling device system 10 constructed in accordance with an embodiment of the invention is illustrated. The battery and cooling device system 10 broadly comprises a thermal battery 12 and a cooling device 14. An embodiment of the cooling device 14 comprises a boiler 16, a condenser 18, a vapor tube 20, a reaction container 22, an extraction thimble 24, and a siphon 26.

The thermal battery 12 provides electrical energy and may be a molten-salt battery, a liquid-metal battery, or any other electrical power source that outputs significant heat. For example, molten-salt batteries use molten salts as an electrolyte and have a high energy density and a high power density. Rechargeable liquid-metal batteries may be used for industrial power backup, special electric vehicles, and grid energy storage to balance out intermittent renewable power sources such as solar panels and wind turbines. The thermal battery 12 may be rechargeable or non-rechargeable and may be stored in a solid state at room temperature for long periods of time before being activated.

Embodiments of the present invention may be implemented on a larger scale than the thermal battery 12 described above. For example, large electrical power implements, such as implements found in commercial settings, nuclear reactors, and other heat generating devices may be cooled with the cooling device 14 or a larger cooling system. Such a cooling device or cooling system may provide on-going cooling, back-up cooling, or situational cooling, including on-demand cooling. For example, such a cooling system may regulate a nuclear reactor temperature or be used to prevent or mitigate a nuclear reactor meltdown incident.

The cooling device 14 is thermally coupled with the battery 12 to efficiently remove heat therefrom. The cooling device 14 may be configured so that the battery 12 may be removed and/or replaced. In this way, the cooling device 14 may be reused even if the battery 12 is not reusable or rechargeable.

The boiler 16 may be positioned near or adjacent to the thermal battery 12 to be thermally coupled with the battery 12 and forms a boiling chamber 28. To that end, the boiler 16 may have a shape that conforms to an outer shape of the battery 12. For example, the boiler 16 may at least partially encircle or even at least partially enclose the battery 12. The battery 12 may alternatively be positioned in the boiler 16. The boiler 16 may be configured so that the battery 12 may be removed from the boiler 16 and replaced. Alternatively, the battery 12 may be permanently integrated with the boiler 16. The boiler 16 may be a flask or similar container and may be made of glass, ceramic, or other material capable of withstanding high temperatures. The boiler 16 may contain liquid solvent 30 (e.g, water) to be boiled into its vapor form for use in an endothermic reaction.

The condenser 18 may be fluidly connected to the boiler 16 via the vapor tube 20 and via the reaction container 22 and may include a condensing chamber 32 and a circulation chamber 34. The condenser 18 may be positioned above the boiler 16 and the reaction container 22. The condenser 18 is shown as a liquid-cooled condenser, but other condensers such as an air-cooled condenser (described below) may be used.

The vapor tube 20 fluidly connects the boiler 16 to the reaction container 22. More specifically, the vapor tube 20 may extend vertically from near an upper end of the boiler 16 to near an upper end of the reaction container 22.

The reaction container 22 may be positioned above the boiler 16 and below the condenser 18 and forms a reaction chamber 36. The reaction container 22 may be fluidly connected to the boiler 16 via the vapor tube 20 and the siphon 26. The reaction container 22 may contain solute 38 in the form of ammonium chloride, ammonium nitrate, disodium tetraborate decahydrate, or any other suitable material that may act as a solute in an endothermic reaction. These solutes have minus 3.8, minus 6.5, and minus 16.8 kcal/g mole heats of solution respectively.

The extraction thimble 24 is positioned in the reaction chamber 36 of the reaction container 22 and holds the solute 38 therein. The extraction thimble 24 is porous to allow liquid solvent to pass through while retaining dissolved solute, as described in more detail below.

The siphon 26 fluidly connects the reaction container 22 to the boiler 16. The siphon 26 may extend vertically upward from near a lower end of the reaction container 22 then vertically downward to near an upper end of the boiler 16, thereby forming an inverted U shape. An upper end of the U shape may be lower than an upper end of the extraction thimble 24 and lower than the upper end of the vapor tube 20.

Components of the cooling device 14 may be compactly arranged so that the cooling device 14 has only a slightly larger width, height, or volume than the thermal battery 12. To that end, certain components such as the vapor tube 20 and siphon 26 may be formed via additive manufacturing. The battery and cooling device system 10 or portions thereof may also have an overall cylindrical shape or minimalist outer shape. This may improve heat transfer away from the battery and hence battery cooling efficiency.

Use of the battery and cooling device system 10 will now be described. First, the thermal battery 12 may be activated to provide an intended electrical energy output. The thermal battery 12 generates incidental heat that boils the liquid solvent 30 in the boiling chamber 28 of the boiler 16 so that the liquid solvent 30 changes to its vapor phase. The boiling action draws heat from the thermal battery 12.

The vaporized solvent 30 then travels up the vapor tube 20 into the reaction chamber 36 of the reaction container 22. The vaporized solvent 30 continues into the condensing chamber 32 of the condenser 18. The condenser 18 then cools at least some of the vaporized solvent 30 so that it condenses to its liquid phase and drops into the reaction chamber 36 of the reaction container 22. In one embodiment, the liquidated solvent 30 drops directly into the extraction thimble 24.

The liquidated solvent 30 then dissolves some of the solute 38 in the extraction thimble 24, resulting in a liquid solution. This may be an endothermic reaction, which further draws heat from the thermal battery 12, either directly or indirectly. The extraction thimble 24 retains the dissolved solute 38 while allowing the liquidated solvent 30 to pass through its pores outside of the extraction thimble 24 but inside the reaction chamber 36. Some of the liquidated solvent 30 also fills the upward portion of the siphon 26.

A level of the liquidated solvent 30 in the reaction chamber 36 and the upward portion of the siphon 26 rises as more solvent is condensed in the condensing chamber 32 until the upper portion of the siphon 26 is filled and begins to spill into the downward portion of the siphon 26. This triggers a siphon effect in which the liquidated solvent 30 drains through the siphon 26 into the boiling chamber 28 of the boiler 16, leaving solidified solute 38 in the extraction thimble 24.

Boiling of liquid solvent 30 in the boiler 16, condensing of vaporized solvent in the condenser 18, and dissolving of solute 38 in the reaction container 22 may be virtually continuous, with draining of the liquid solvent 30 from the reaction container 22 being cyclic. To that end, there may be enough liquid solvent 30 to sustain continuous boiling, condensing, and dissolving.

The above-described battery and cooling device system 10 provides several advantages. For example, the cooling device 14 automatically removes heat from the thermal battery 12 via boiling the solvent 30. Further cooling is automatically effected via the endothermic reaction. The thermal battery 12 can be removed from the cooling device 14 and replaced. Furthermore, the cooling device 14 has virtually infinite shelf life so it can be stored with the thermal battery 12.

Figure 3:
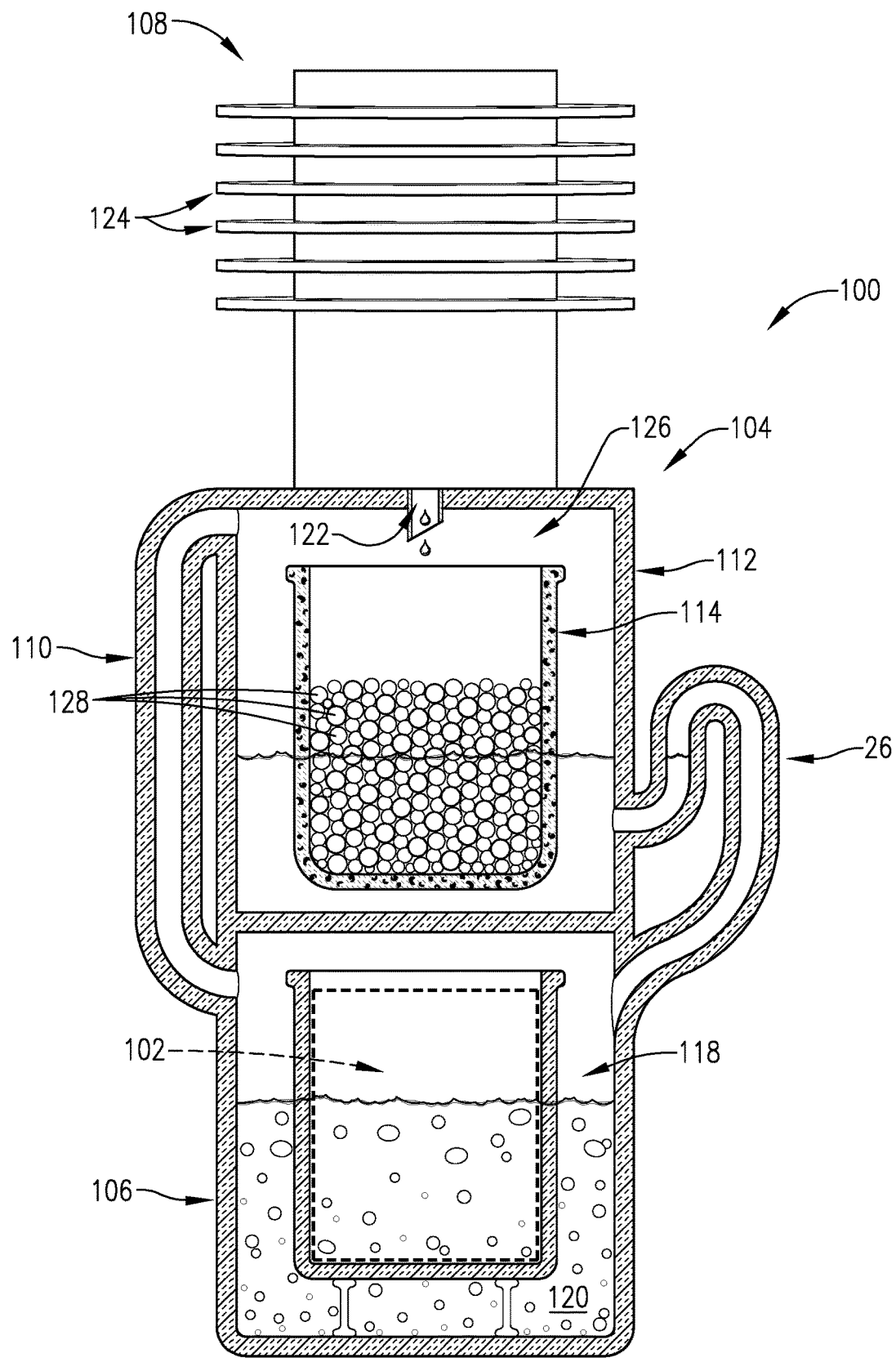
FIG. 3 is a front elevation view of a battery and cooling device system constructed in accordance with another embodiment of the invention.

Turning to FIG. 3, a battery and cooling device system 100 constructed in accordance with another embodiment of the invention is illustrated. The battery and cooling device system 100 broadly comprises a thermal battery 102 and a cooling device 104. The cooling device 104 comprises a boiler 106, a condenser 108, a vapor tube 110, a reaction container 112, an extraction thimble 114, and a siphon 116. The battery and cooling device system 100 is substantially similar to the battery and cooling device system 10 described above except the condenser 108 is air cooled.

The thermal battery 102 provides electrical energy and may be a molten-salt battery, a liquid-metal battery, or any other electrical power source that outputs significant heat. For example, molten-salt batteries use molten salts as an electrolyte and have a high energy density and a high power density. Rechargeable liquid-metal batteries may be used for industrial power backup, special electric vehicles, and grid energy storage to balance out intermittent renewable power sources such as solar panels and wind turbines. The thermal battery 102 may be rechargeable or non-rechargeable and may be stored in a solid state at room temperature for long periods of time before being activated.

The cooling device 104 is thermally coupled with the battery 102 to efficiently remove heat therefrom. The cooling device 104 may be configured so that the battery 102 may be removed and/or replaced. In this way, the cooling device 104 may be reused even if the battery 102 is not reusable or rechargeable.

The boiler 106 may be positioned near or adjacent to the thermal battery 102 to be thermally coupled with the battery 102 and forms a boiling chamber 118. To that end, the boiler 106 may have a shape that conforms to an outer shape of the battery 102. For example, the boiler 106 may at least partially encircle or even at least partially enclose the battery 102. The battery 102 may alternatively be positioned in the boiler 106. The boiler 106 may be configured so that the battery 102 may be removed from the boiler 106 and replaced. Alternatively, the battery 102 may be permanently integrated with the boiler 106. The boiler 106 may be a flask or similar container and may be made of glass, ceramic, or other material capable of withstanding high temperatures. The boiler 106 may contain liquid solvent 120 (e.g, water) to be boiled into its vapor form for use in an endothermic reaction.

The condenser 108 may be fluidly connected to the boiler 106 via the vapor tube 110 and via the reaction container 112 and may include a condensing chamber 122 and a plurality of heat fins 124. The condenser 108 may be positioned above the boiler 106 and the reaction container 112.

The vapor tube 110 fluidly connects the boiler 106 to the reaction container 112. More specifically, the vapor tube 110 may extend vertically from near an upper end of the boiler 106 to near an upper end of the reaction container 112.

The reaction container 112 may be positioned above the boiler 106 and below the condenser 108 and forms a reaction chamber 126. The reaction container 112 may be fluidly connected to the boiler 106 via the vapor tube 110 and the siphon 116. The reaction container 112 may contain solute 128 in the form of ammonium chloride, ammonium nitrate, disodium tetraborate decahydrate, or any other suitable material that may act as a solute in an endothermic reaction. These solutes have minus 3.8, minus 6.5, and minus 16.8 kcal/g mole heats of solution respectively.

The extraction thimble 114 is positioned in the reaction chamber 126 of the reaction container 112 and holds the solute 128 therein. The extraction thimble 114 is porous to allow liquid solvent to pass through while retaining dissolved solute, as described in more detail below.

The siphon 116 fluidly connects the reaction container 112 to the boiler 106. The siphon 116 may extend vertically upward from near a lower end of the reaction container 112 then vertically downward to near an upper end of the boiler 106, thereby forming an inverted U shape. An upper end of the U shape may be lower than an upper end of the extraction thimble 114 and lower than the upper end of the vapor tube 110.

Components of the cooling device 104 may be compactly arranged so that the cooling device 104 has only a slightly larger width, height, or volume than the thermal battery 102. To that end, certain components such as the vapor tube 110 and siphon 116 may be formed via additive manufacturing. The battery and cooling device system 100 or portions thereof may also have an overall cylindrical shape or minimalist outer shape. This may improve heat transfer away from the battery and hence battery cooling efficiency.

Use of the battery and cooling device system 100 will now be described. First, the thermal battery 102 generates incidental heat that boils the liquid solvent 120 in the boiling chamber 118 of the boiler 106 so that the liquid solvent 120 changes to its vapor phase. The boiling action draws heat from the thermal battery 102.

The vaporized solvent 120 then travels up the vapor tube 110 into the reaction chamber 126 of the reaction container 112. The vaporized solvent 120 continues into the condensing chamber 122 of the condenser 108. The condenser 108 then cools at least some of the vaporized solvent 120 so that it condenses to its liquid phase and drops into the reaction chamber 126 of the reaction container 112. More particularly, 108 heat may be dissipated into ambient air via the heat fins 124. This may be advantageous over a liquid cooled condenser because a circulated liquid is not needed.

The liquidated solvent 120 then dissolves some of the solute 128 in the extraction thimble 114, resulting in a liquid solution. This may be an endothermic reaction, which further draws heat from the thermal battery 102, either directly or indirectly. The extraction thimble 114 retains the dissolved solute 128 while allowing the liquidated solvent 120 to pass through its pores outside of the extraction thimble 114 but inside the reaction chamber 126. Some of the liquidated solvent 120 also fills the upward portion of the siphon 116.

A level of the liquidated solvent 120 in the reaction chamber 126 and the upward portion of the siphon 116 rises as more solvent is condensed in the condensing chamber 122 until the upper portion of the siphon 116 is filled and begins to spill into the downward portion of the siphon 116. This triggers a siphon effect in which the liquidated solvent 120 drains through the siphon 116 into the boiling chamber 118 of the boiler 106, leaving solidified solute 128 in the extraction thimble 114.

Boiling of liquid solvent 120 in the boiler 106, condensing of vaporized solvent in the condenser 108, and dissolving of solute 128 in the reaction container 112 may be virtually continuous, with draining of the liquid solvent 120 from the reaction container 112 being cyclic. To that end, there may be enough liquid solvent 120 to sustain continuous boiling, condensing, and dissolving.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A device for cooling a heat generating implement, the device comprising:
    a boiler for boiling a solvent from its liquid phase to its vapor phase via heat drawn from the heat generating implement;
    a condenser fluidly connected to the boiler for condensing the vaporized solvent to its liquid phase;
    a reaction container fluidly connected to the condenser and configured to receive the liquidated solvent from the condenser so that the liquidated solvent interacts with a solute in the reaction container to effect an endothermic reaction to further draw heat from the heat generating implement, the condenser being positioned above the reaction container; and
    a vapor tube connecting the boiler to the reaction container so that the vaporized solvent travels through the vapor tube from the boiler to the reaction container and into the condenser.

2. The device of claim 1, the reaction container being positioned above the boiler, the device further comprising a siphon connecting the reaction container to the boiler, the siphon being configured to drain the liquid solvent from the reaction container into the boiler once a predetermined amount of liquid solvent fills the reaction container.

3. The device of claim 1, wherein the heat generating implement is a thermal battery, and the boiler is shaped to at least partially encircle the thermal battery.

4. The device of claim 1, wherein the heat generating implement is a thermal battery and the device is configured to be reused with another thermal battery.

5. The device of claim 1, wherein the condenser is a liquid-cooled condenser.

6. The device of claim 1, wherein the condenser is an air condenser.

7. The device of claim 1, wherein the solute is ammonium chloride.

8. The device of claim 1, wherein the solute is ammonium nitrate.

9. The device of claim 1, wherein the solute is disodium tetraborate decahydrate.

10. A device for cooling a heat generating implement, the device comprising:
    a boiler for boiling a solvent from its liquid phase to its vapor phase via heat drawn from the heat generating implement;
    a condenser fluidly connected to the boiler for condensing the vaporized solvent to its liquid phase;
    a reaction container fluidly connected to the condenser and configured to receive the liquidated solvent from the condenser so that the liquidated solvent interacts with a solute in the reaction container to effect an endothermic reaction to further draw heat from the heat generating implement, the reaction container being positioned above the boiler, and
    a siphon connecting the reaction container to the boiler, the siphon being configured to drain the liquid solvent from the reaction container into the boiler once a predetermined amount of liquid solvent fills the reaction container.

11. The device of claim 10, the condenser being positioned above the reaction container, the device further comprising a vapor tube connecting the boiler to the reaction container so that the vaporized solvent travels through the vapor tube from the boiler to the reaction container and into the condenser.

12. The device of claim 10, wherein the boiler is shaped to at least partially encircle the heat generating element.

13. The device of claim 10, wherein the condenser is a liquid-cooled condenser.

14. The device of claim 10, wherein the condenser is an air condenser.

15. The device of claim 10, wherein the solute is ammonium chloride.

16. The device of claim 10, wherein the solute is ammonium nitrate.

17. The device of claim 10, wherein the solute is disodium tetraborate decahydrate.

18. A battery and cooling device system comprising:
    a thermal battery configured to provide electrical energy; and a cooling device thermally coupled to the thermal battery, the cooling device comprising:
- a boiler for boiling a solvent from its liquid phase to its vapor phase via heat drawn from the thermal battery, the boiler at least partially encircling the thermal battery;
- a condenser positioned above and fluidly connected to the boiler for condensing the vaporized solvent to its liquid phase;
- a vapor tube connecting the boiler to the reaction container so that the vaporized solvent travels through the vapor tube from the boiler into the condenser;
- a reaction container above the boiler and below and fluidly connected to the condenser, the reaction container being configured to receive the liquidated solvent from the condenser so that the liquidated solvent interacts with a solute in the reaction container to effect an endothermic reaction to further draw heat from the thermal battery; and
- a siphon connecting the reaction container to the boiler, the siphon being configured to drain the liquid solvent from the reaction container into the boiler once a predetermined amount of liquid solvent fills the reaction container.

* * * * *